(12) United States Patent
Wang

(10) Patent No.: US 7,997,173 B2
(45) Date of Patent: Aug. 16, 2011

(54) ADJUSTABLE TOOL SUPPORTING MECHANISM FOR MACHINE TOOL

(76) Inventor: Teng Hung Wang, Tainan (TW)

( * ) Notice: Subject to any disclaimer, the term of this patent is extended or adjusted under 35 U.S.C. 154(b) by 336 days.

(21) Appl. No.: 12/387,371

(22) Filed: May 1, 2009

(65) Prior Publication Data

US 2010/0275748 A1 Nov. 4, 2010

(51) Int. Cl.
 *B23B 29/12* (2006.01)
 *B23B 21/00* (2006.01)
(52) U.S. Cl. ............................................. 82/158; 82/157
(58) Field of Classification Search .................... 82/117, 82/122, 133, 136, 137, 157, 158; 29/52, 29/27 R, 565, 40, 41, 27 C
See application file for complete search history.

(56) References Cited

U.S. PATENT DOCUMENTS

| | | | |
|---|---|---|---|
| 3,159,065 A * | 12/1964 | Diener | 82/111 |
| 3,277,569 A * | 10/1966 | Verhoeven | 483/5 |
| 3,521,368 A * | 7/1970 | Seybold | 33/501.14 |
| 4,018,113 A | 4/1977 | Blazenin et al. | 82/2 B |
| 4,270,421 A * | 6/1981 | Robinson et al. | 82/133 |
| 4,763,886 A | 8/1988 | Takei | 269/73 |
| 4,999,895 A | 3/1991 | Hirose et al. | 29/33 P |
| 5,152,201 A | 10/1992 | Izawa | 82/1.11 |
| 5,392,502 A * | 2/1995 | Freer | 29/52 |
| 5,490,307 A | 2/1996 | Link | 29/27 C |
| 6,230,379 B1 * | 5/2001 | Shoji | 29/27 C |

* cited by examiner

*Primary Examiner* — Will Fridie, Jr.
(74) *Attorney, Agent, or Firm* — Charles E. Baxley

(57) ABSTRACT

A machine tool a slide attached on a base and moveable along an X-axis, a carriage attached onto the slide and moveable along a Y-axis, a follower rotatably mounted on the carriage, a sliding member attached on the follower and moveable along a Z-axis, a carrier rotatably attached to the sliding member, and a tool holder mounted on the carrier and rotatable relative to the carrier to selected angular positions for supporting a shaft, and a barrel slidably received in the shaft for supporting a tool member. The barrel includes a noncircular chamber for engaging with a noncircular shank of the tool member and for preventing the shank of the tool member from rotating relative to the barrel and the shaft.

19 Claims, 15 Drawing Sheets

ADJUSTABLE TOOL SUPPORTING MECHANISM FOR MACHINE TOOL

BACKGROUND OF THE INVENTION

1. Field of the Invention

The present invention relates to a machine tool, and more particularly to a machine tool including an adjustable tool supporting mechanism for suitably supporting the tool members and for easily adjusting the tool members to any required position or location.

2. Description of the Prior Art

Typical machine tools comprise a turret or headstock disposed on top of a bed, and a tool supporting mechanism movably disposed on top of the bed for supporting the tool members and for adjusting the tool members longitudinally, laterally and vertically along X, Y and Z axes and for adjusting the tool members to the required positions or locations.

For example, U.S. Pat. No. 4,018,113 to Blazenin et al. discloses one of the typical apparatuses for adjusting the cutting edge of a tool in a machine tool, and including a tool supporting mechanism for supporting the tool members, and an adjusting mechanism for adjusting the tool supporting mechanism and the tool members to the required positions or locations.

However, normally, the adjusting mechanism may only be used to adjust the tool supporting mechanism and the tool members longitudinally, laterally and vertically along X, Y and Z axes only, and may not be used to adjust the tool members to the required angular positions.

U.S. Pat. No. 4,763,886 to Takei, U.S. Pat. No. 4,999,895 to Hirose et al., U.S. Pat. No. 5,152,201 to Izawa, U.S. Pat. No. 5,392,502 to Freer, and U.S. Pat. No. 5,490,307 to Link disclose the other typical machine tool apparatuses each also comprising a tool supporting mechanism for supporting the tool members, and an adjusting mechanism for adjusting the tool supporting mechanism and the tool members to the required positions or locations.

However, similarly, the adjusting mechanism may only be used to adjust the tool supporting mechanism and the tool members longitudinally, laterally and vertically along X, Y and Z axes only, and may not be used to adjust the tool members to the required angular positions.

The present invention has arisen to mitigate and/or obviate the afore-described disadvantages of the conventional machine tool apparatuses.

SUMMARY OF THE INVENTION

The primary objective of the present invention is to provide a machine tool including an adjustable tool supporting mechanism for suitably supporting the tool members and for easily adjusting the tool members to any required position or location.

In accordance with one aspect of the invention, there is provided a machine tool comprising a base, a slide slidably attached onto the base and moveable along an X-axis, a carriage slidably attached onto the slide and moveable along a Y-axis, a follower rotatably mounted on the carriage with an axle, and rotatable and adjustable relative to the carriage to selected angular positions, a sliding member slidably attached onto the follower and moveable along a Z-axis, a carrier rotatably attached to the sliding member and rotatable and adjustable relative to the sliding member to selected angular positions, and a tool holder rotatably mounted on the carrier and rotatable and adjustable relative to the carrier to selected angular positions for supporting a tool member.

The tool holder is rotatably attached to the carrier with a pivot pole, and a fastener is secured to the tool holder and slidably engaged with a curved groove that is formed in the carrier for limiting the tool holder to rotate relative to the carrier.

The carrier includes a lateral extension for rotatably supporting the tool holder, and includes an angular graduation for indicating an angular position of the tool holder relative to the carrier.

The carrier includes a curved passageway formed therein, and a fastener is secured to the sliding member and slidably engaged with the curved passageway of the carrier for limiting the carrier to rotate relative to the sliding member.

The sliding member includes an angular graduation for indicating an angular position of the carrier relative to the sliding member.

The follower includes a column extended upwardly therefrom, the sliding member is slidably attached onto the column of the follower, a threaded member is rotatably mounted on the column of the follower and disposed parallel to the Z-axis, and a motor is attached to the follower and coupled to the threaded member for rotating the threaded member relative to the column of the follower, the sliding member is slidably attached onto the column of the follower and engaged with the threaded member which actuates the sliding member to move along the threaded member and the Z-axis.

The follower includes a curved channel formed therein and disposed around the axle, and a fastener is secured to the carriage and slidably engaged with the curved channel of the follower for limiting the follower to rotate relative to the carriage.

The tool holder includes a bore formed therein, and a shaft rotatably received and engaged in the bore of the tool holder and rotatable and adjustable relative to the tool holder to selected angular positions for supporting the tool member.

The tool holder includes an angular graduation for indicating an angular position of the shaft relative to the tool holder. The shaft includes a section extended out of the tool holder and secured to a hand grip.

The shaft includes a stop secured to the hand grip, and an anchor member attached onto the tool holder and engageable with the anchor member for limiting the shaft and the hand grip to rotate relative to the tool holder.

The tool holder includes a spring member engaged between the tool holder and the anchor member for resiliently anchoring and securing the anchor member to the tool holder.

The shaft includes a plurality of slots formed in an outer peripheral portion thereof and equally spaced from each other, and a latch is slidably engaged in the tool holder and includes an actuating member engageable into the slots of the shaft for anchoring and latching the shaft to the tool holder at the selected angular positions. The tool holder includes a bar secured thereon and having an aperture formed therein for slidably receiving the latch.

The bar includes a deeper cavity and a shallower cavity formed therein, a knob is secured to the latch and includes a projection extended outwardly therefrom for engaging with either the deeper cavity or the shallower cavity of the bar and arranged for retaining the actuating member of the latch either in engagement with the slots of the shaft or in disengagement from the shaft.

The shaft includes an orifice formed therein, and a barrel slidably received in the orifice of the shaft and secured to the shaft with a fastener for supporting the tool member. The barrel includes a noncircular chamber formed therein for engaging with a shank of the tool member.

The barrel includes a flat surface formed therein, and the tool member includes a flat surface for engaging with the flat surface of the barrel and for preventing the shank of the tool member from rotating relative to the barrel and the shaft.

The tool member includes an inclined ramp formed in the shank, and a fastener is engaged through the barrel and engaged into the noncircular chamber of the barrel and engageable with the ramp of the shank of the tool member for securing the shank of the tool member to the barrel and to the shaft.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 6:
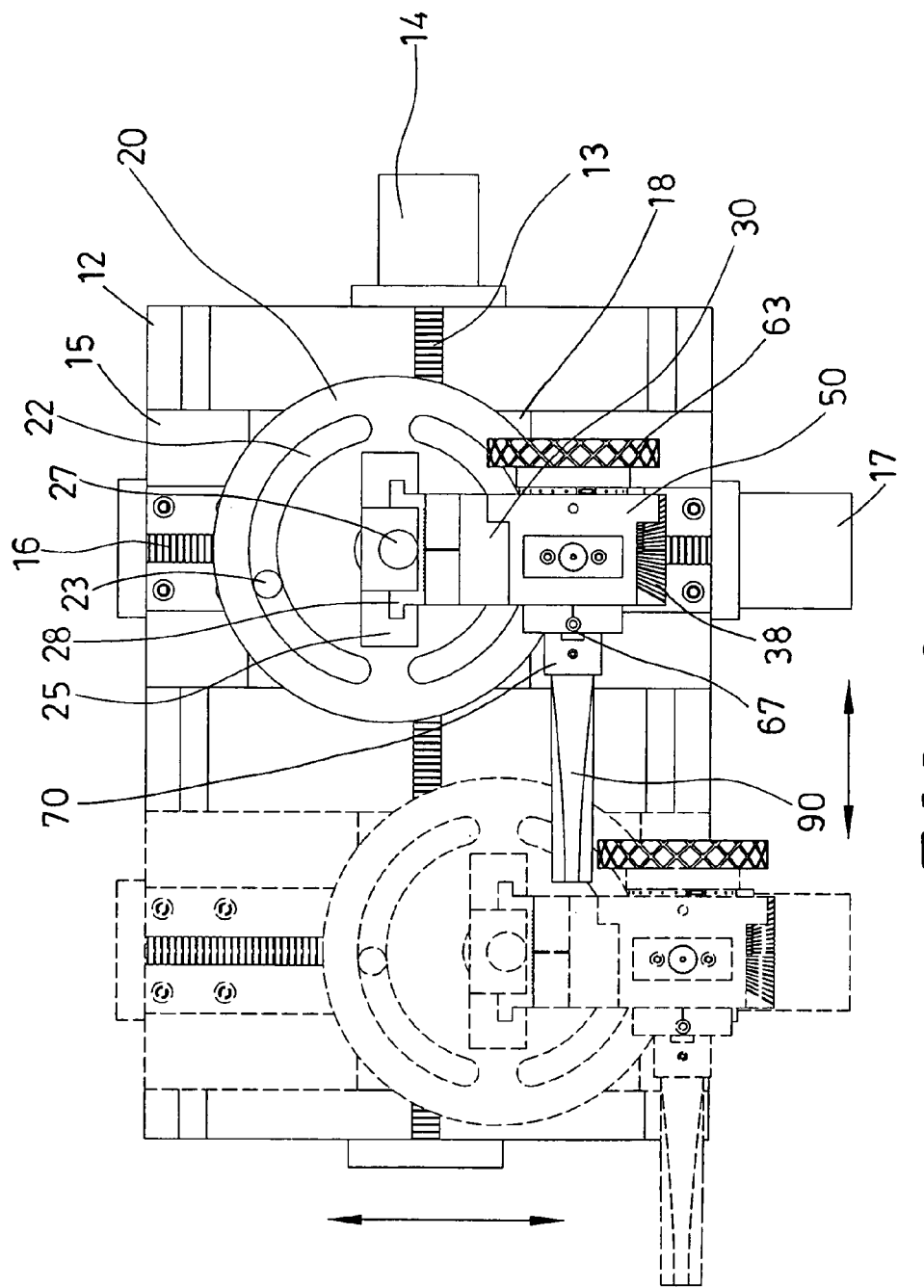
FIG. 6 is a top plan schematic view illustrating the operation of the machine tool.
Figure 7:
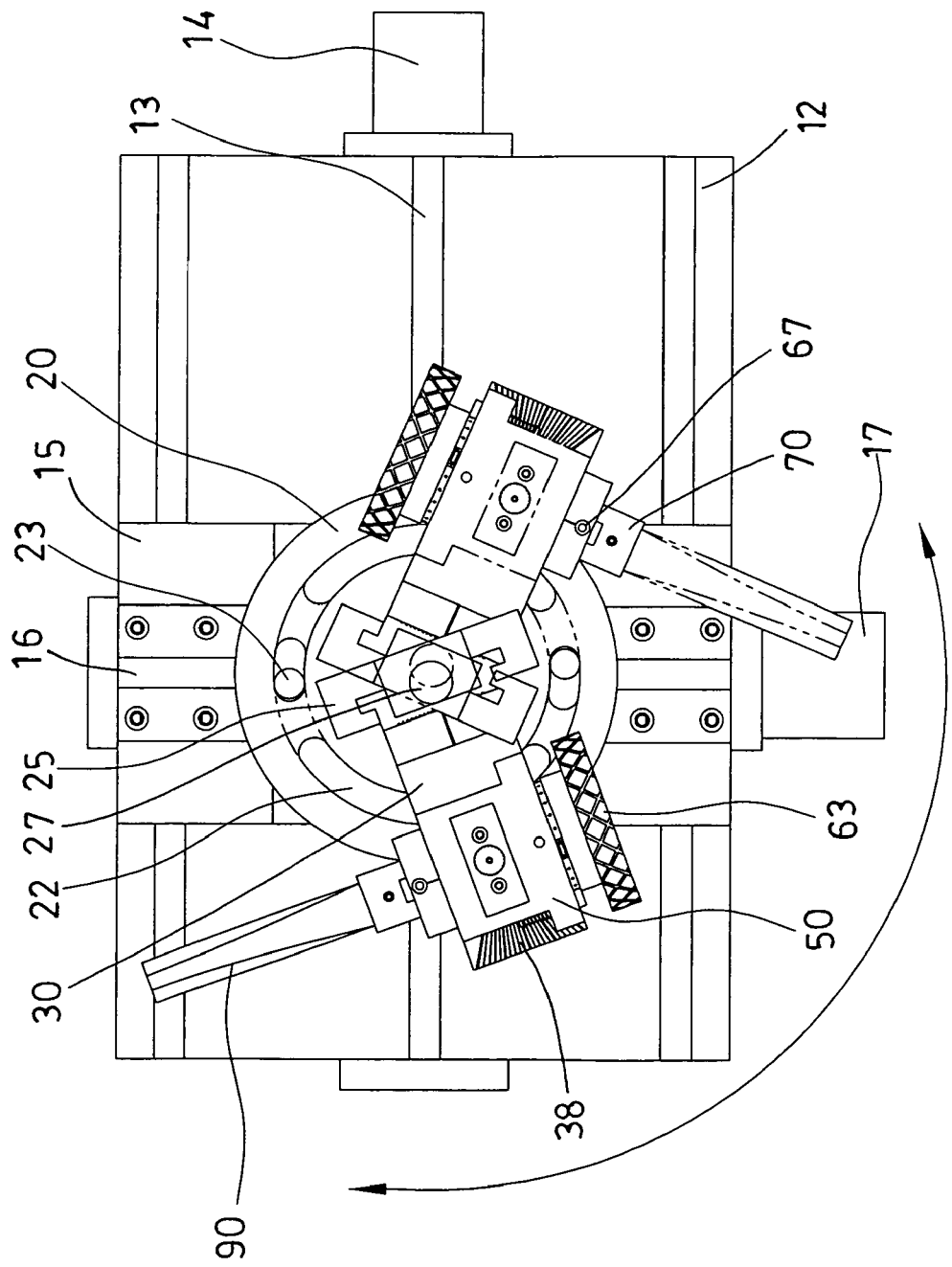
FIGS. 7, 8, 9, 10 are top plan schematic views similar to FIG. 6, illustrating the operation of the machine tool.
Figure 8:
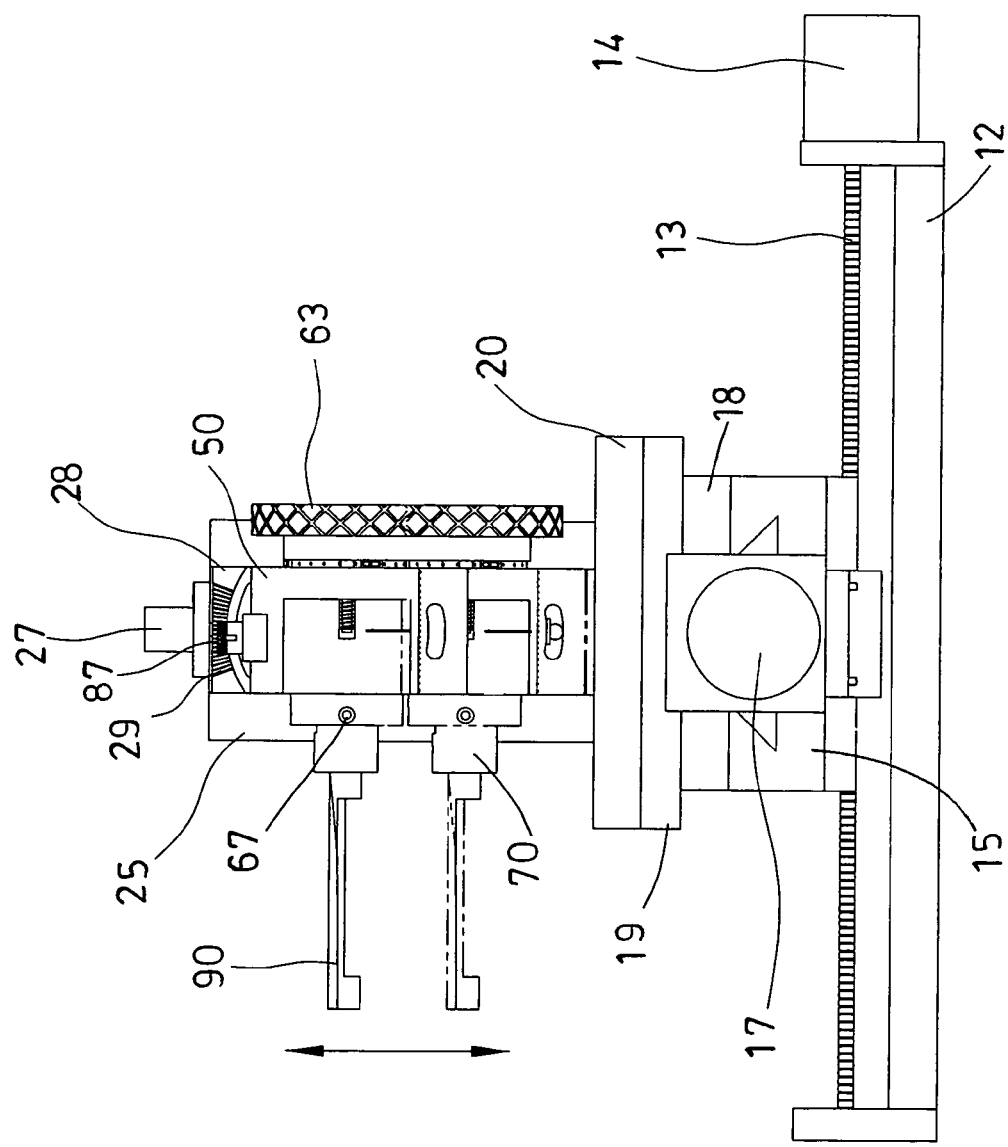
Figure 9:
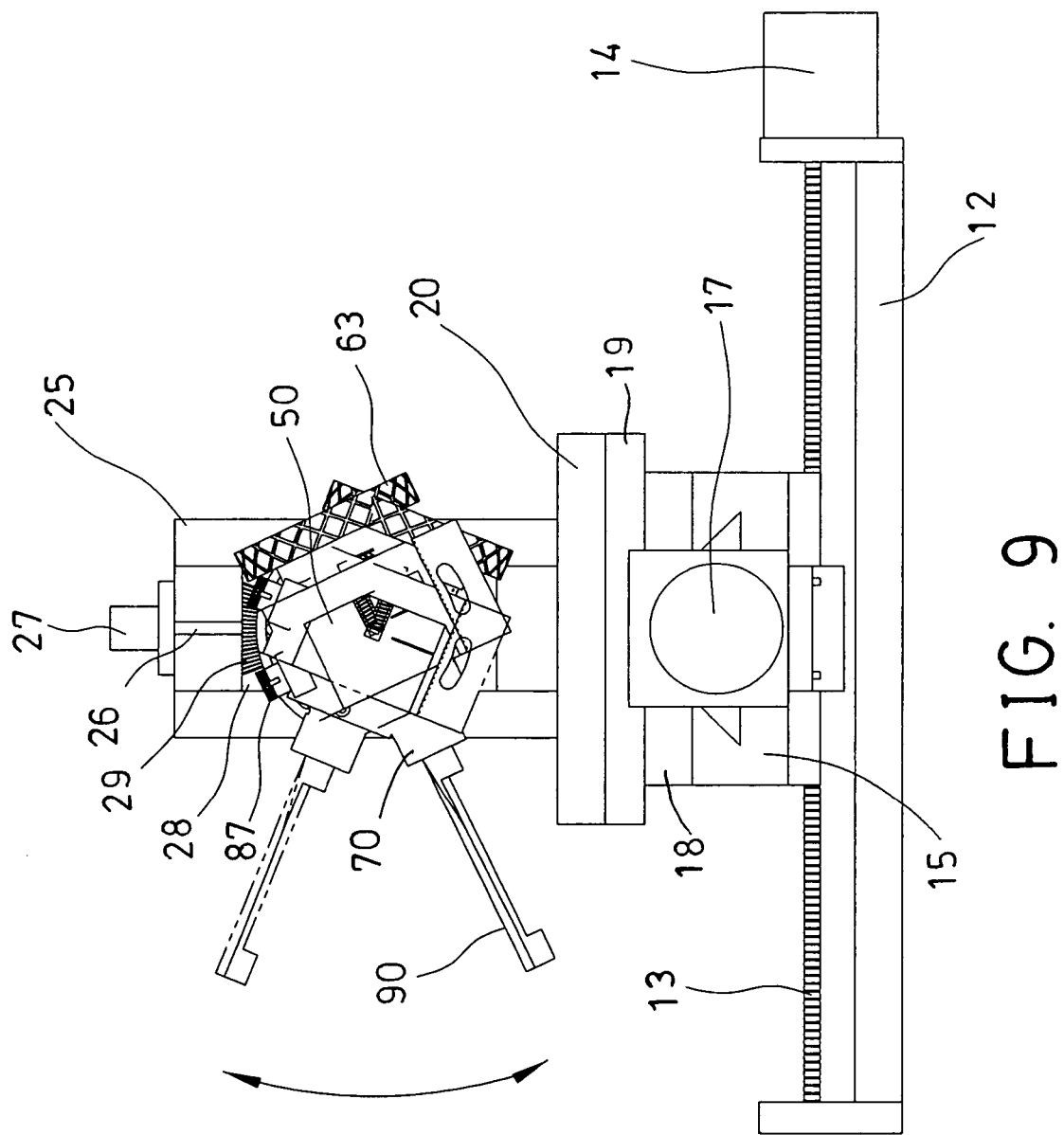
Figure 10:
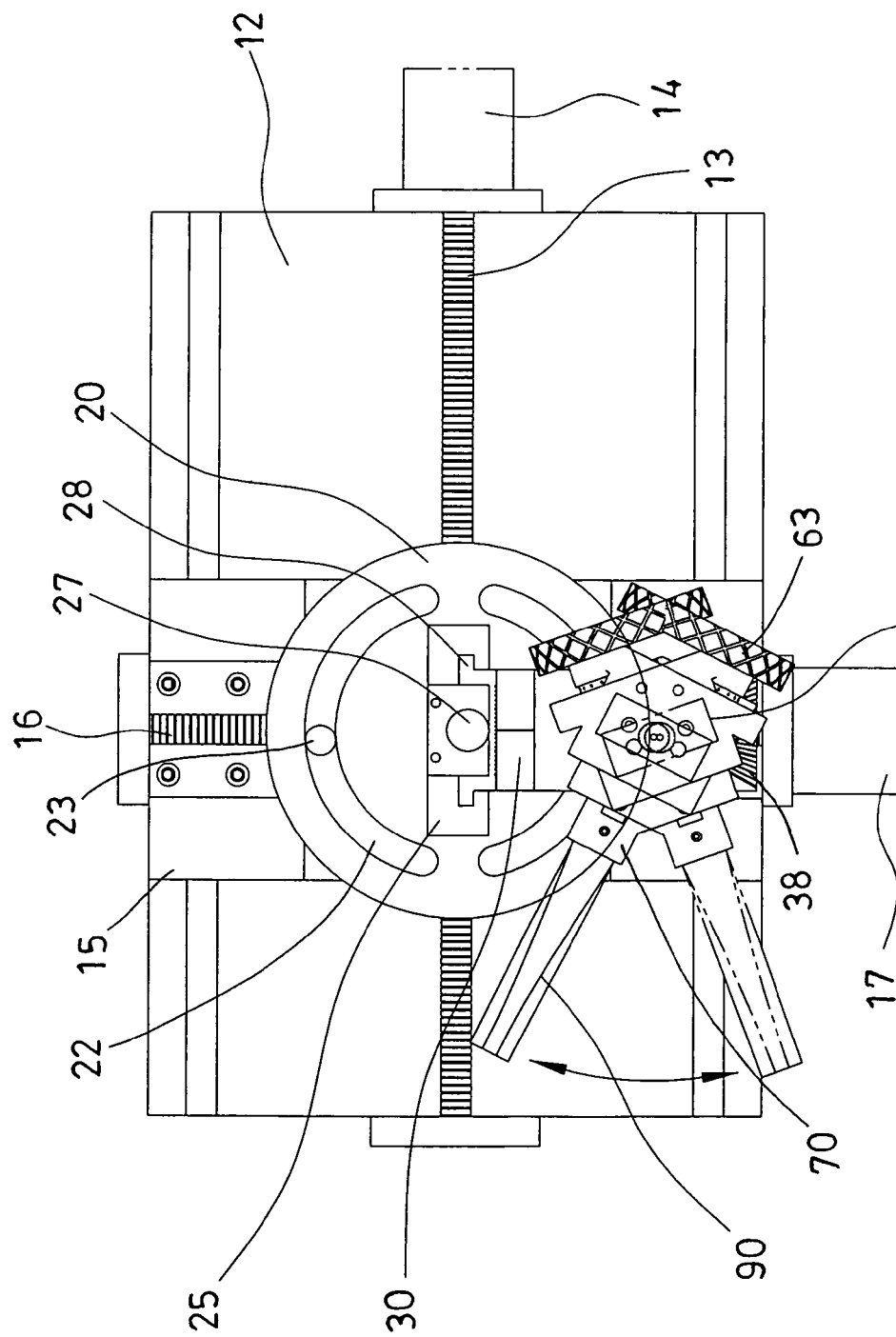
Figure 11:
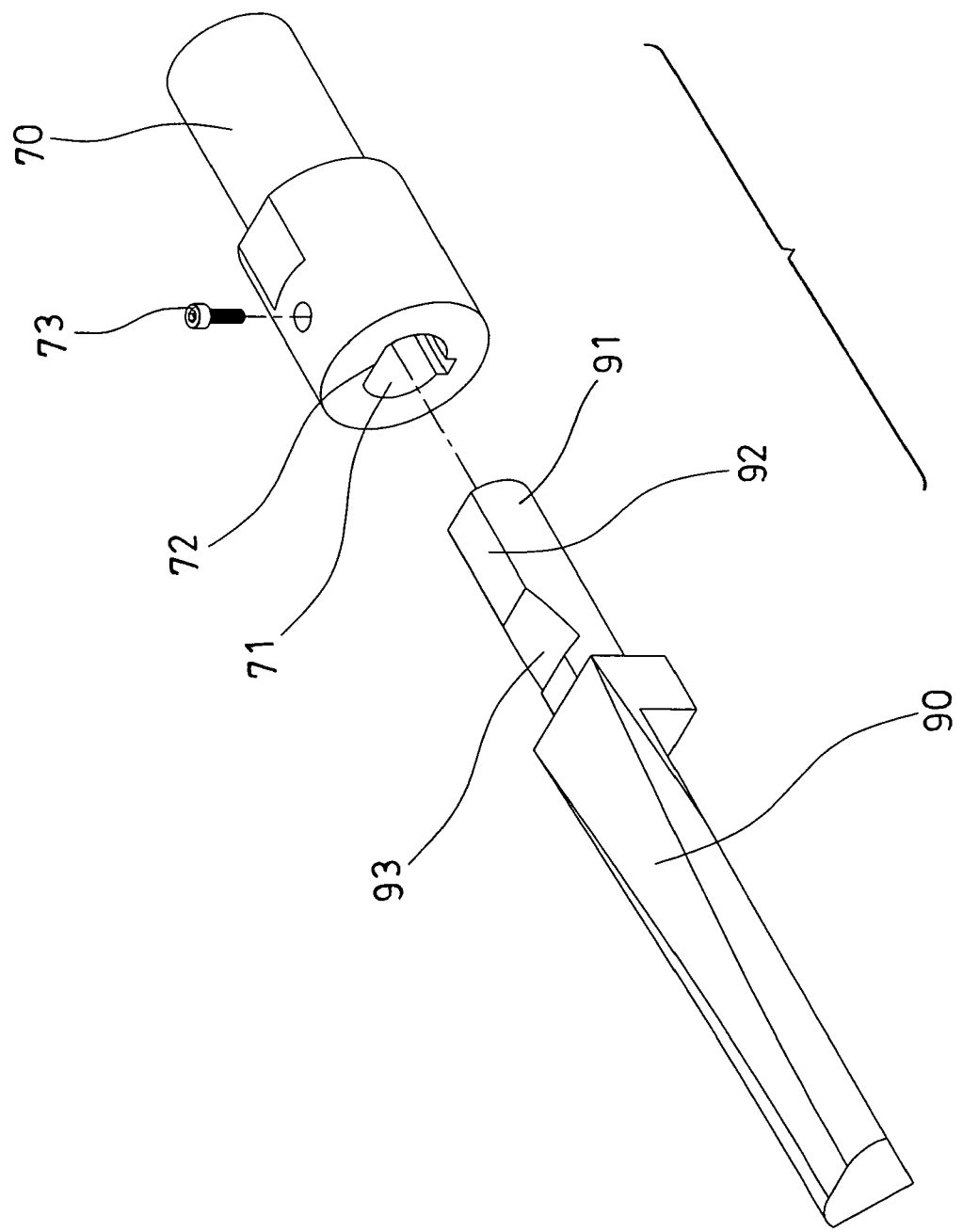
FIG. 11 is a further partial exploded view of the machine tool.
Figure 12:
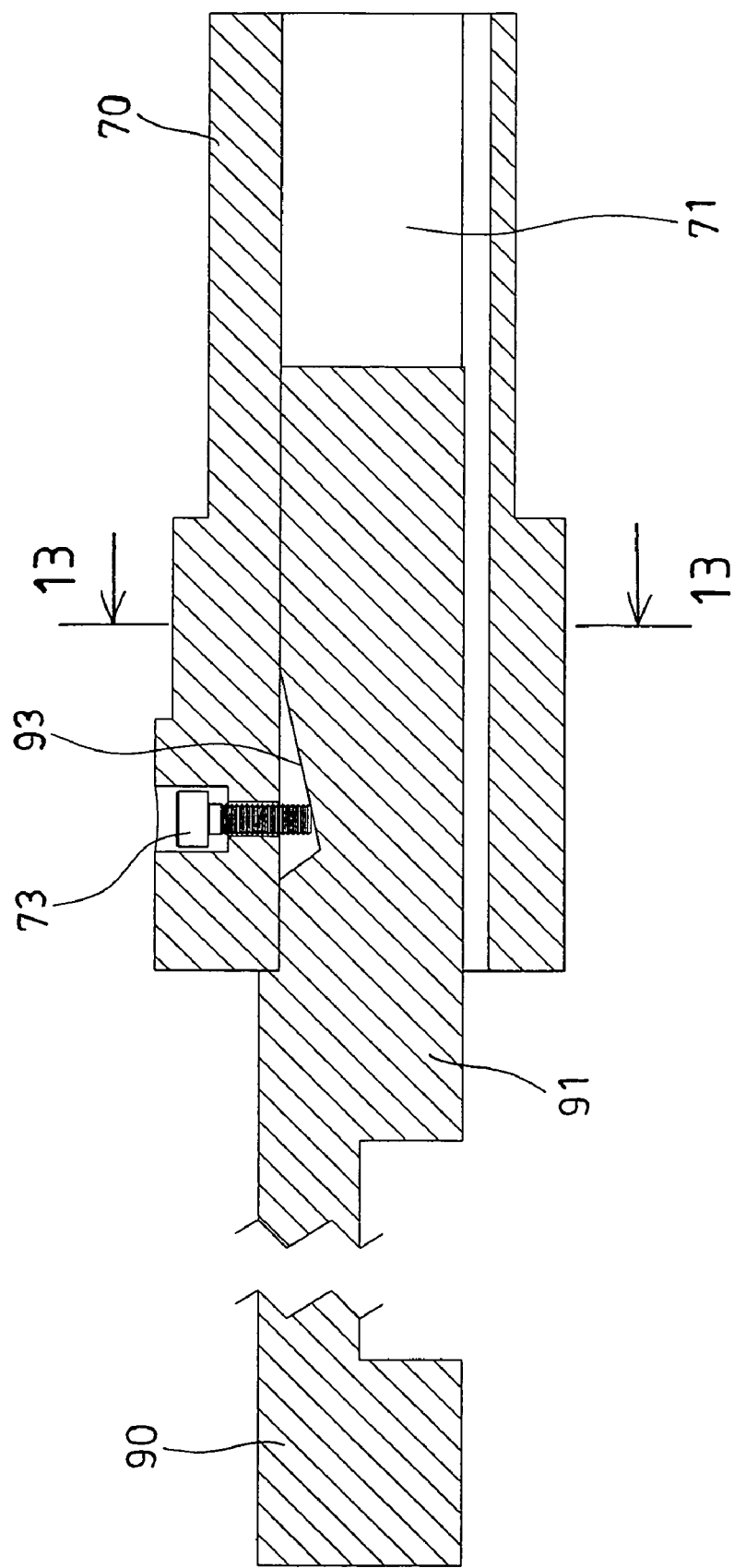
FIG. 12 is another cross sectional view of the machine tool taken along lines 12-12 of FIG. 13.

Referring to the drawings, and initially to FIGS. 1-3 and 6-10, a machine tool in accordance with the present invention comprises a turret or headstock 11 disposed on top of a bed 10, a base 12 disposed or provided on top of the bed 10, an elongate bolt or threaded member 13 rotatably disposed or attached or mounted on the base 12 and disposed or arranged along or parallel to the X-axis (FIG. 3), a step or servo motor 14 attached or mounted on the base 12 and coupled to the threaded member 13 for rotating the threaded member 13 relative to the base 12, a slide 15 slidably attached or mounted onto the base 12 with such as a dovetail sliding engagement and engaged with the threaded member 13 which may actuate the slide 15 to move along the threaded member 13 and the X-axis (FIG. 6).

Another elongate bolt or threaded member 16 is rotatably disposed or attached or mounted on the slide 15 and disposed or arranged along or parallel to the Y-axis (FIG. 3), another step or servo motor 17 is attached or mounted on the slide 15 and coupled to the threaded member 16 for rotating the threaded member 16 relative to the slide 15, a carriage 18 is slidably attached or mounted onto the slide 15 with such as a dovetail sliding engagement and engaged with the threaded member 16 which may actuate the carriage 18 to move along the threaded member 16 and the Y-axis (FIG. 6) relative to the base 12 and the bed 10. The above-described structure is typical and will not be described in further details.

A follower 20 is rotatably disposed or attached or mounted on an upper support plate 19 of the carriage 18 with an axle 21, and includes one or more (such as two) curved and opposite channels 22 formed therein and disposed or arranged around the axle 21, and the carriage 18 includes one or more (such as two) latches or bolts or fasteners 23 disposed or extended upwardly from the upper support plate 19 and slidably engaged within the curved channels 22 of the follower 20 for guiding and limiting the follower 20 to rotate relative to the carriage 18 (FIG. 7), and one or more (such as two) lock nuts 24 are threaded or engaged with the fasteners 23 for locking or securing the follower 20 to the carriage 18 at the required angular position.

The follower 20 includes a column 25 extended upwardly therefrom, a further elongate bolt or threaded member 26 is rotatably disposed or attached or mounted on the column 25 of the follower 20 and disposed or arranged along or parallel to the Z-axis (FIG. 3), and a further step or servo motor 27 is attached or mounted on the column 25 or the follower 20 and coupled to the threaded member 26 for rotating the threaded member 26 relative to the column 25 or the follower 20, a sliding member 28 is slidably attached or mounted onto the column 25 or the follower 20 with such as a dovetail sliding engagement and engaged with the threaded member 26 which may actuate the sliding member 28 to move along the threaded member 26 and the Z-axis (FIG. 8) relative to the follower 20 and the base 12 and the bed 10. The sliding member 28 includes an angular graduation 29 formed or provided thereon.

A carrier 30 includes a vertical plate 31 pivotally or rotatably coupled or attached or mounted onto the sliding member 28 with a pivot pin 32 (FIG. 3) for allowing the plate 31 and the carrier 30 to be rotated relative to the sliding member 28 and the column 25 or the follower 20 (FIG. 9), and the rotational or angular positions of the plate 31 and the carrier 30 relative to the sliding member 28 may be read with the angular graduation 29 that is formed or provided on the sliding member 28. A fastener 33 is secured to the sliding member 28 and slidably engaged within a curved passageway 34 of the carrier 30 for guiding and limiting the carrier 30 to rotate relative to the sliding member 28 and the follower 20 and for locking or securing the carrier 30 to the sliding member 28 and the follower 20 at the required angular position.

Figure 1:
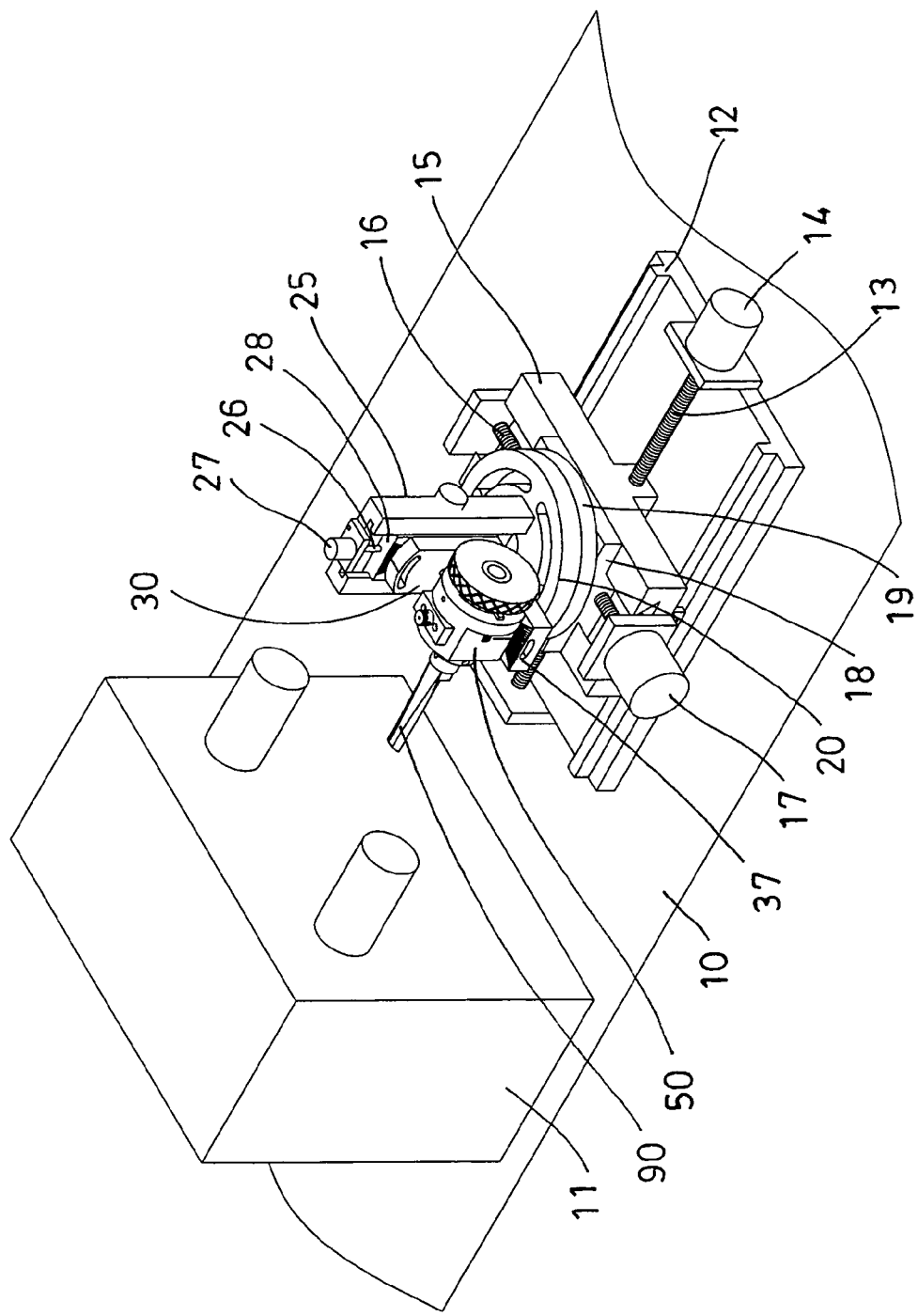
FIG. 1 is a partial perspective view of a machine tool in accordance with the present invention.
Figure 2:
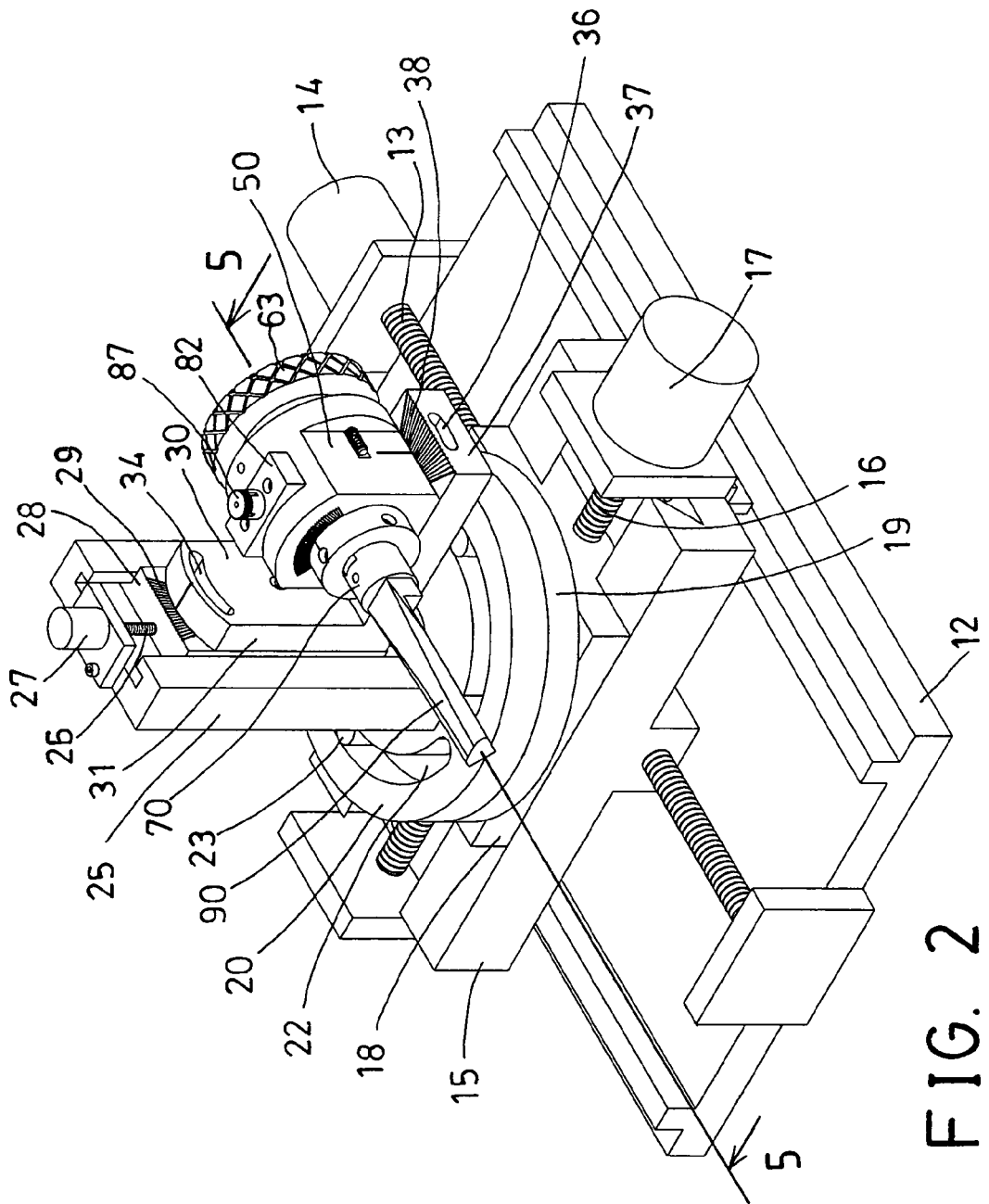
FIG. 2 is another partial perspective view of the machine tool.
Figure 3:
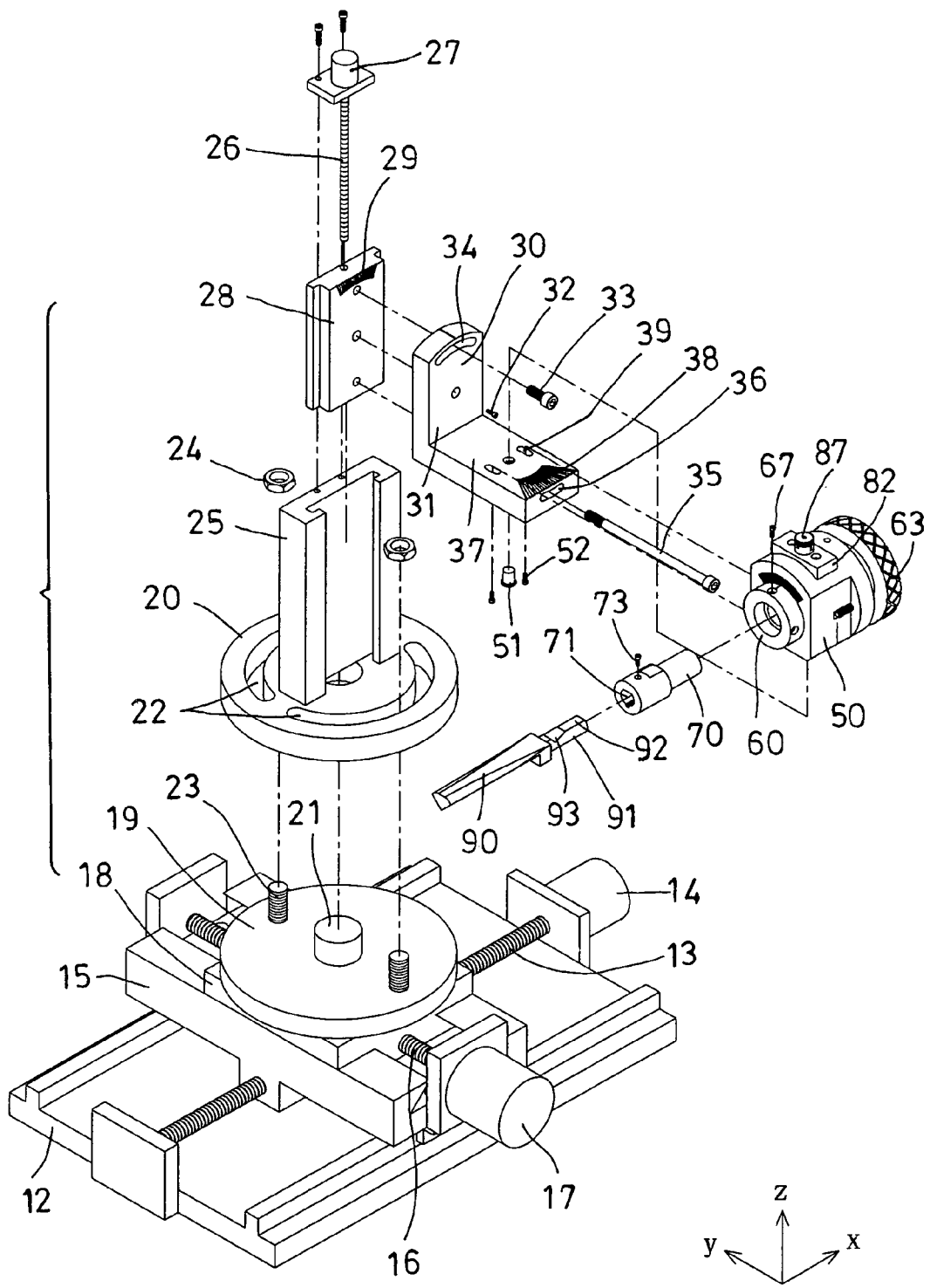
FIG. 3 is a partial exploded view of the machine tool.

As shown in FIG. 3, another fastener 35 may further be provided and slidably engaged with another curved passage 36 that is formed or provided in a lateral extension 37 of the carrier 30 (FIG. 2) for further guiding and limiting the carrier 30 to rotate relative to the sliding member 28 and the follower 20 and for further locking or securing the carrier 30 to the sliding member 28 and the follower 20 at the required angular position. The carrier 30 also includes an angular graduation 38 formed or provided thereon, and the carrier 30 may thus be rotated or adjusted relative to the sliding member 28 and the follower 20 to the required angular position before the fasteners 33, 35 lock or secure the carrier 30 to the sliding member 28 and the follower 20.

A tool holder 50 is pivotally or rotatably coupled or attached or mounted onto the carrier 30, such as attached or mounted onto the lateral extension 37 of the carrier 30 with a pivot pole 51 (FIG. 3) for allowing the tool holder 50 to be rotated relative to the lateral extension 37 of the carrier 30 about the pivot pole 51 to the required angular position (FIG. 10), one or more (such as two) latches or bolts or fasteners 52 (FIG. 3) are secured to the bottom portion of the tool holder 50 and provided and slidably engaged with the curved grooves 39 that are formed or provided in the lateral extension 37 of the carrier 30 (FIG. 3) for guiding and limiting the tool holder 50 to rotate relative to the lateral extension 37 of the carrier 30 and for locking or securing the tool holder 50 to the carrier 30 at the required angular position, and the rotational or angular positions of the tool holder 50 relative to the carrier 30 may be read with the angular graduation 38 that is formed or provided on the lateral extension 37 of the carrier 30.

Figure 4:
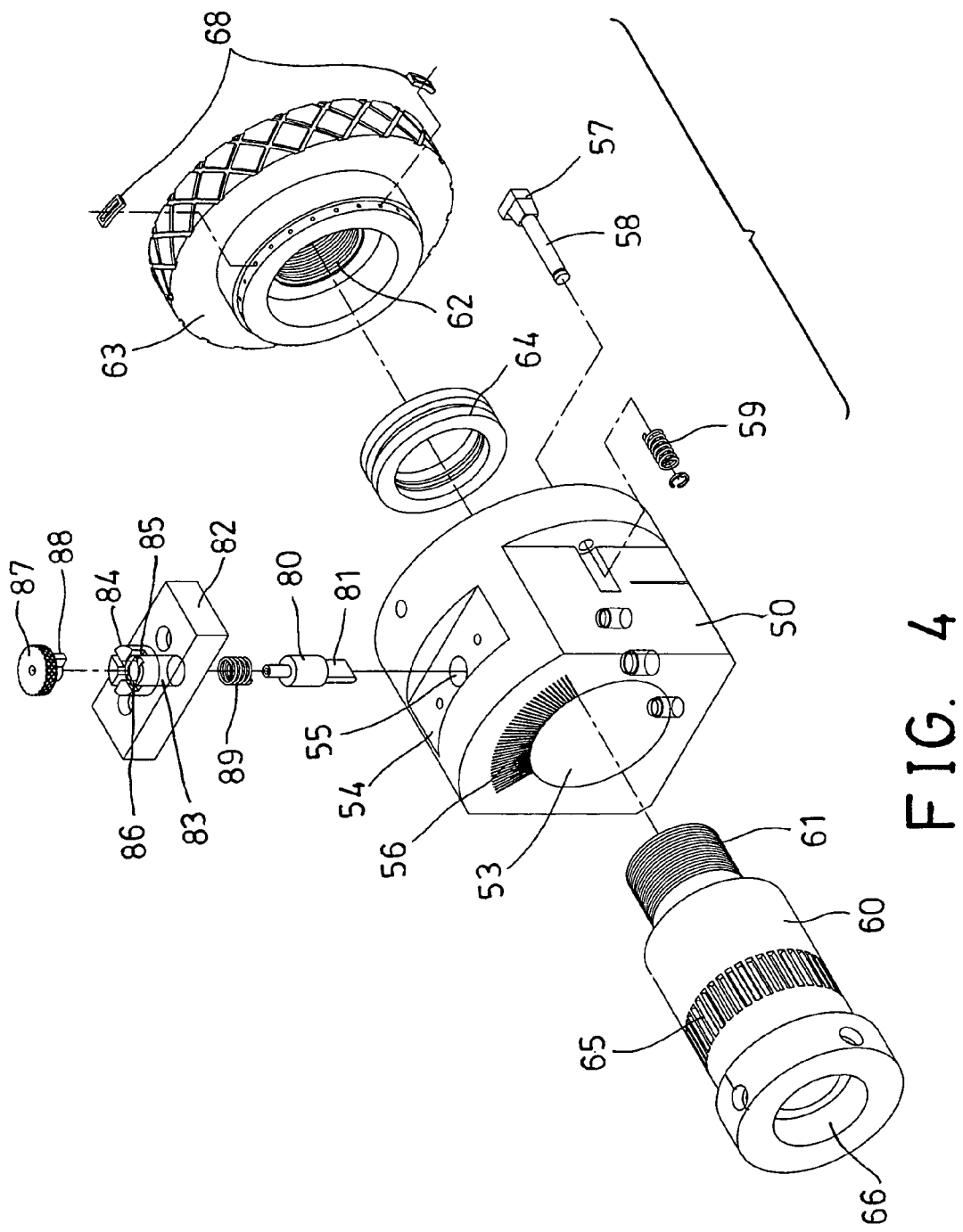
FIG. 4 is another partial exploded view of the machine tool.

The tool holder 50 includes a longitudinal bore 53 formed therein (FIGS. 4-5, 14-15) for pivotally or rotatably receiving a shaft 60 therein, and includes a depression 54 formed in the upper portion thereof, and includes a pathway 55 vertically formed therein and communicating with the bore 53 thereof, the shaft 60 includes a threaded section 61 extended out of the tool holder 50 (FIG. 5) and threaded or engaged with the inner thread 62 of a knob or hand wheel or hand grip 63 for securing the shaft 60 to the hand grip 63 and for allowing the shaft 60 to be rotated relative to the tool holder 50 with the hand grip 63, a bearing member 64 may further be provided and attached or disposed between the hand grip 63 and the shaft 60 and/or the tool holder 50 (FIG. 5), and the tool holder 50 includes an angular graduation 56 formed or provided thereon (FIG. 4).

The shaft 60 includes a number of slots 65 formed in the outer peripheral portion thereof and equally spaced from each other, and includes an orifice 66 formed therein for slidably receiving a holding member or barrel 70 which may be solidly secured to the shaft 60 with latches or fasteners 67 (FIGS. 3, 5), a latch 80 is slidably received or engaged in the pathway 55 of the tool holder 50 and includes an actuating end or member 81 engageable into the slots 65 of the shaft 60 (FIGS. 5, 14) for anchoring or latching the shaft 60 to the tool holder 50 at the required or selected or suitable angular position. A bar 82 may be engaged into the depression 54 of the tool holder 50 and secured to the tool holder 50, and includes an aperture 83 formed therein and aligned with the pathway 55 of the tool holder 50 for slidably receiving the latch 80.

Figure 15:
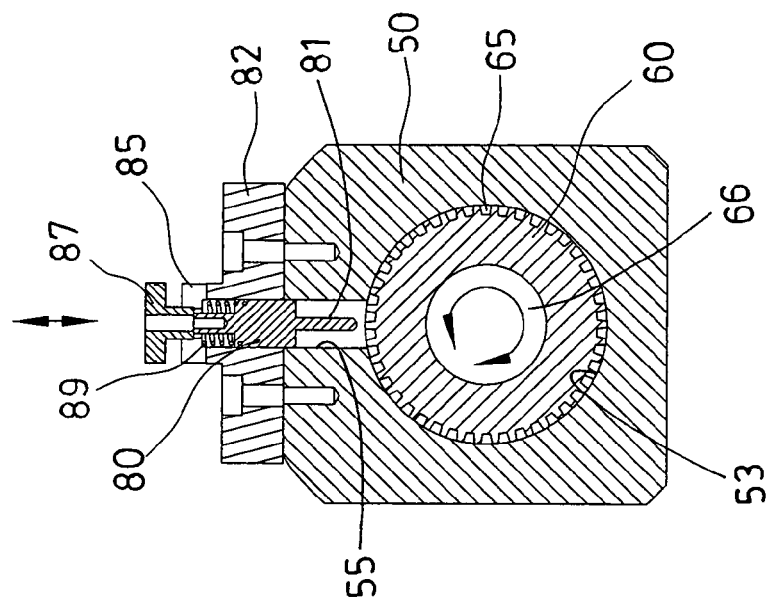
FIG. 15 is a still further cross sectional view similar to FIG. 14, illustrating the operation of the machine tool.

The bar 82 includes a seat 84 formed or provided on top thereof, or extended upwardly therefrom, and includes a deeper cavity 85 and a shallower cavity 86 formed therein, such as formed in the seat 85. A knob 87 is attached or mounted or secured to the latch 80, and includes a projection 88 extended outwardly therefrom for engaging with either the deeper cavity 85 or the shallower cavity 86 of the bar 82 and arranged for allowing the actuating member 81 of the latch 80 either to be engaged with the slots 65 of the shaft 60 (FIG. 14) or to be disengaged from the shaft 60 (FIG. 15). A spring member 89 may be attached onto the latch 80, and disposed or engaged between the latch 80 and the bar 82 for biasing or forcing the actuating member 81 of the latch 80 to engage with either of the slots 65 of the shaft 60. The rotational or angular positions of the shaft 60 relative to the tool holder 50 may be read with the angular graduation 56 that is formed or provided on the tool holder 50.

Figure 5:
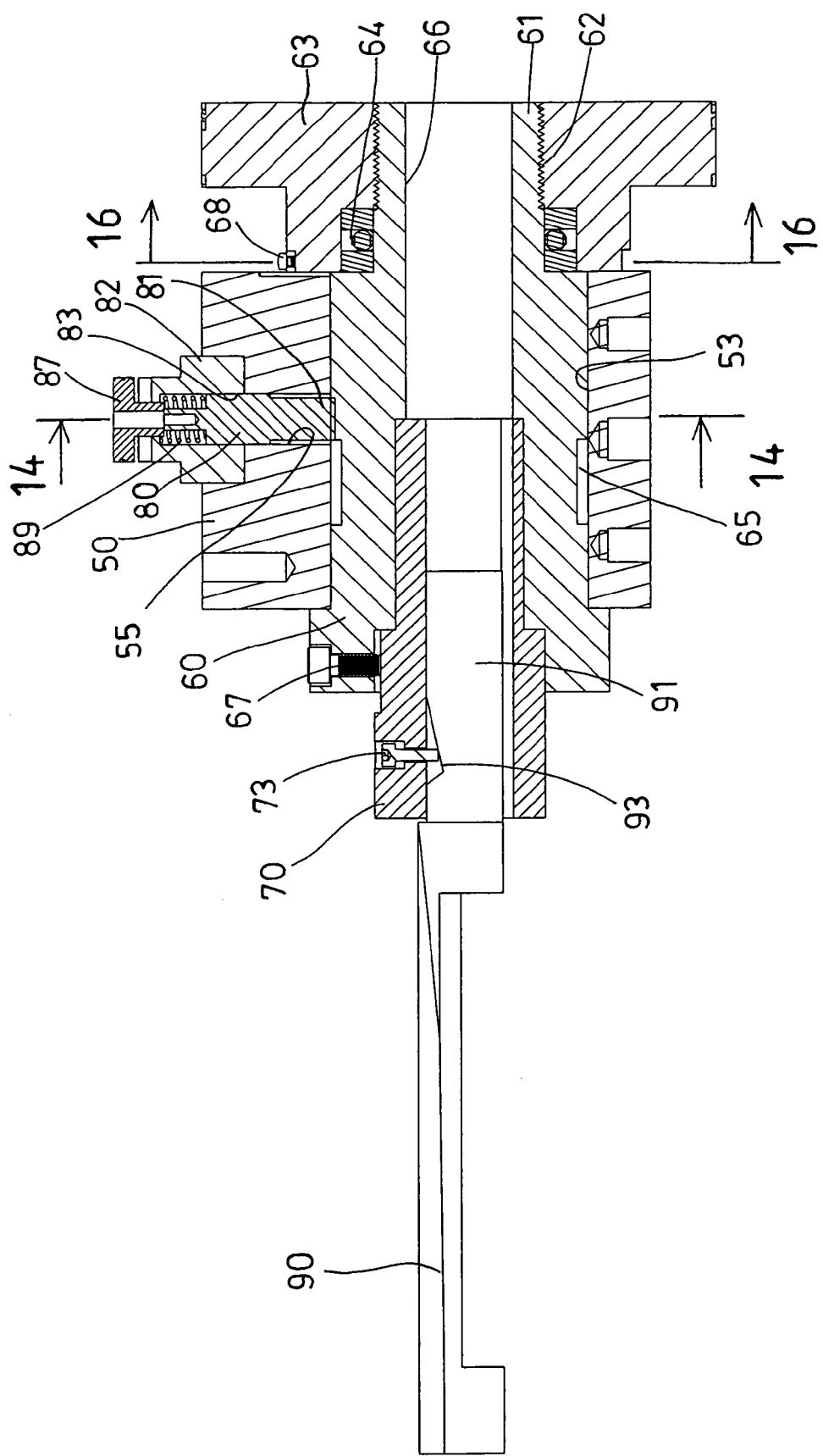
FIG. 5 is a cross sectional view of the machine tool taken along lines 5-5 of FIG. 2.
Figure 14:
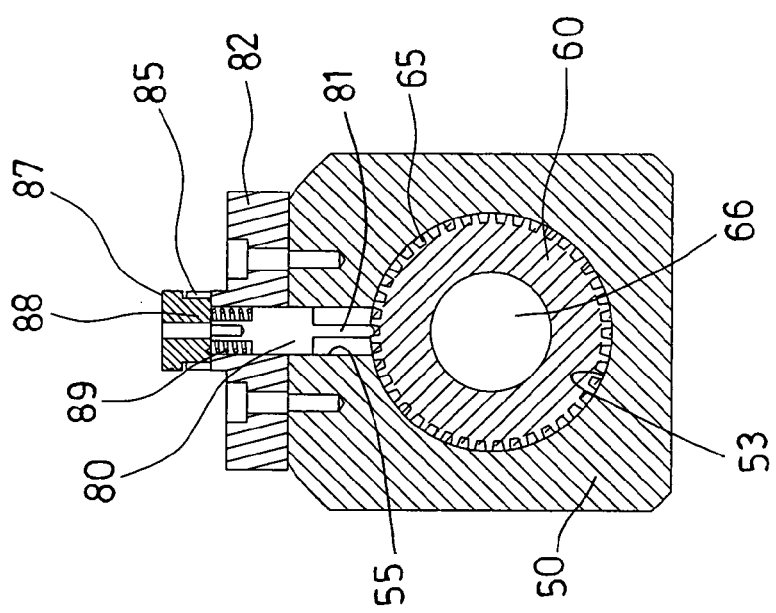
FIG. 14 is a still further cross sectional view of the machine tool taken along lines 14-14 of FIG. 5.
Figure 13:
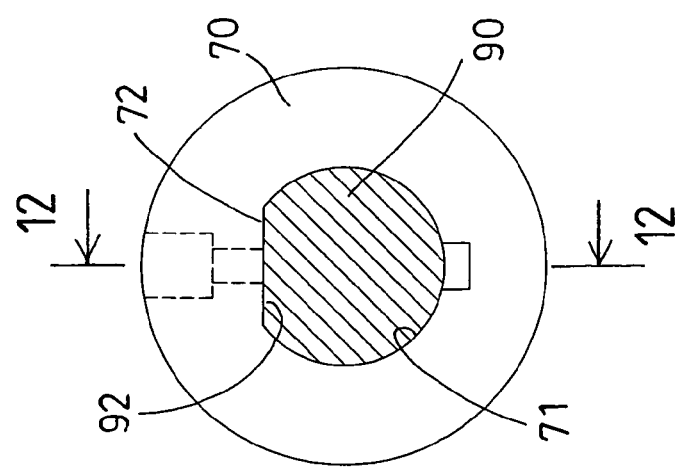
FIG. 13 is a further cross sectional view of the machine tool taken along lines 13-13 of FIG. 12.

In operation, as shown in FIGS. 5 and 14, when the projection 88 of the knob 87 is engaged with the deeper cavity 85 of the bar 82, or when the projection 88 of the knob 87 is disengaged from the shallower cavity 86 of the bar 82, the actuating member 81 of the latch 80 may be biased or forced to engage with either of the slots 65 of the shaft 60 by the spring member 89, in order to anchor or latch or secure the shaft 60 to the tool holder 50 at the required or selected or suitable angular position. On the contrary, as shown in FIG. 15, when the projection 88 of the knob 87 is engaged with the shallower cavity 86 of the bar 82, or disengaged from the deeper cavity 85 of the bar 82, the actuating member 81 of the latch 80 may be disengaged from the shaft 60 for allowing the shaft 60 to be rotated or adjusted relative to the tool holder 50 to the required or selected angular position before the actuating member 81 of the latch 80 is forced to engage with either of the slots 65 of the shaft 60 again.

Figure 17:
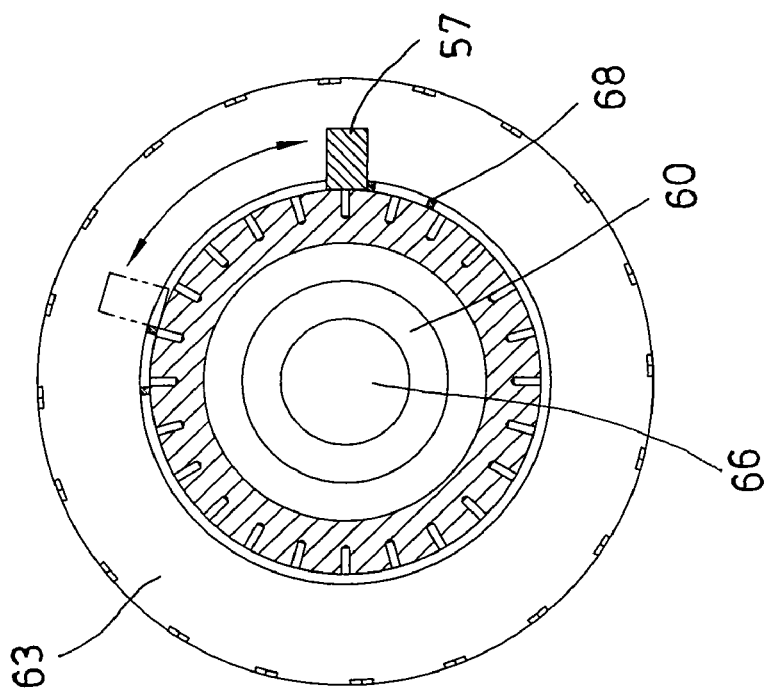
FIG. 17 is a still further cross sectional view similar to FIG. 16, illustrating the operation of the machine tool.
Figure 16:
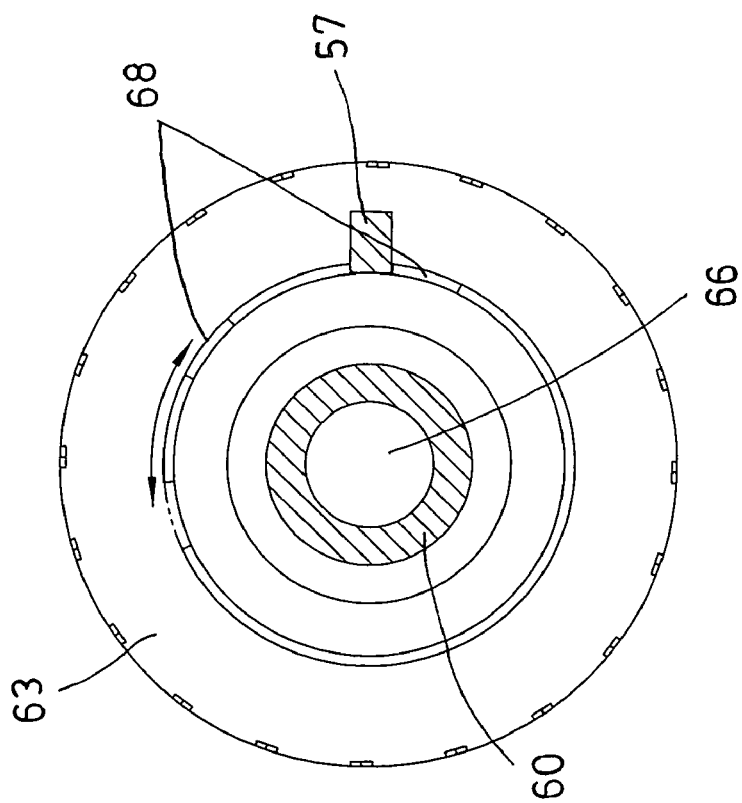
FIG. 16 is a still further cross sectional view of the machine tool taken along lines 16-16 of FIG. 5.

As shown in FIG. 4, an anchor member 57 includes a stem 58 engaged through the tool holder 50, and another spring member 59 is disposed or engaged between the tool holder 50 and the anchor member 57 for resiliently anchoring or securing the anchor member 57 to the tool holder 50. One or more (such as two) stops 68 are secured to the hand grip 63 and engageable with the anchor member 57 for limiting the shaft 60 and the hand grip 63 to rotate relative to the tool holder 50 (FIGS. 16, 17). As shown in FIGS. 3, 5, and 11-13, the holding member or barrel 70 includes a noncircular chamber 71 formed therein and having one or more flat surfaces 72 formed or provided therein for receiving or engaging with a shank 91 of a tool member 90.

For example, the tool member 90 includes one or more flat surfaces 92 formed or provided in the shank 91 for engaging with the corresponding flat surfaces 72 of the barrel 70 (FIG. 13) and for preventing the shank 91 of the tool member 90 from rotating relative to the barrel 70 and the shaft 60, and includes a wedge-shaped or inclined ramp 93 formed therein. A further fastener 73 is engaged through the barrel 70 and engaged into the noncircular chamber 71 of the barrel 70 and engageable with the ramp 93 of the shank 91 or of the tool member 90 (FIGS. 5, 12) for solidly securing the shank 91 of the tool member 90 to the barrel 70 and thus to the shaft 60.

Figure 18:
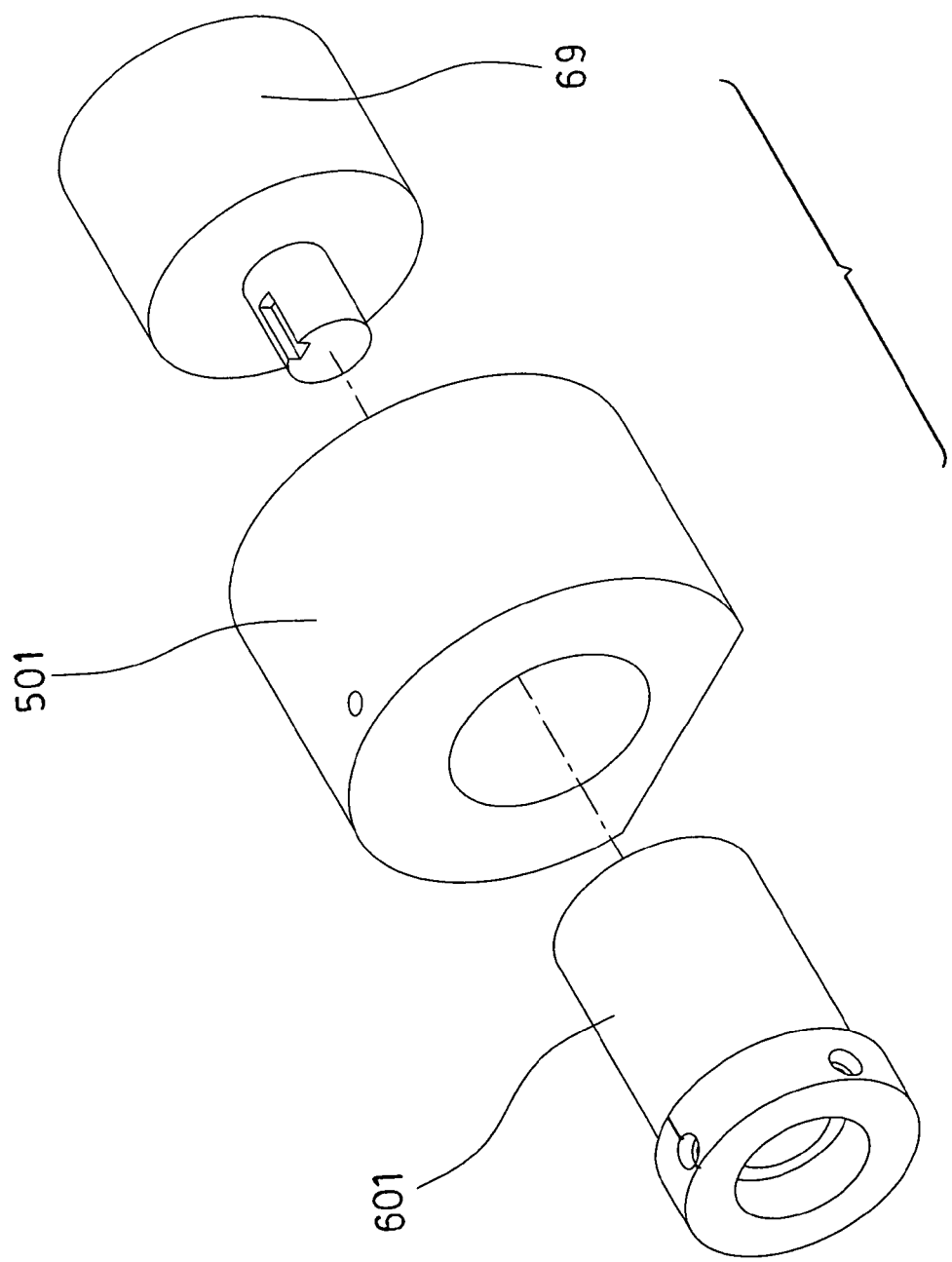
FIG. 18 is a still further partial exploded view illustrating the other arrangement of the machine tool.

Alternatively, as shown in FIG. 18, a further step or servo motor 69 may be attached or mounted to the tool holder 501 and attached or mounted or secured to the shaft 601 for rotating the shaft 601 relative to the tool holder 501 to the required or selected angular position.

In operation, as shown in FIG. 6, the carriage 18 may be actuated or operated to move along the X-axis and the Y-axis relative to the base 12 and the bed 10 with the threaded members 13, 16, the column 25 of the follower 20 may be actuated or operated to adjust or to rotate relative to the carriage 18 to the required or selected or suitable angular position, the sliding member 28 and the carrier 30 and the tool holder 50 may be actuated or operated to move or to slide along the Z-axis relative to the base 12 and the bed 10 with the threaded member 26, in addition, the carrier 30 may be actuated or operated to adjust or to rotate relative to the sliding member 28, and the tool holder 50 may be actuated or operated to adjust or to rotate relative to the carrier 30 such that the tool member 90 may be suitably adjusted or rotated or moved relative to the base 12 and the bed 10 to any selected or suitable position.

Accordingly, the machine tool in accordance with the present invention includes an adjustable tool supporting mechanism for suitably supporting the tool members and for easily adjusting the tool members to any required position or location.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A machine tool comprising:
   a base,
   a slide slidably attached onto said base and moveable along an X-axis,
   a carriage slidably attached onto said slide and moveable along a Y-axis,
   a follower rotatably mounted on said carriage with an axle, and rotatable and adjustable relative to said carriage to selected angular positions,
   a sliding member slidably attached onto said follower and moveable along a Z-axis,
   a carrier rotatably attached to said sliding member and rotatable and adjustable relative to said sliding member to selected angular positions, and
   a tool holder rotatably mounted on said carrier and rotatable and adjustable relative to said carrier to selected angular positions for supporting a tool member.

2. The machine tool as claimed in claim 1, wherein said tool holder is rotatably attached to said carrier with a pivot pole, and a fastener is secured to said tool holder and slidably engaged with a curved groove that is formed in said carrier for limiting said tool holder to rotate relative to said carrier.

3. The machine tool as claimed in claim 1, wherein said carrier includes a lateral extension for rotatably supporting said tool holder, and includes an angular graduation for indicating an angular position of said tool holder relative to said carrier.

4. The machine tool as claimed in claim 1, wherein said carrier includes a curved passageway formed therein, and a fastener is secured to said sliding member and slidably engaged with said curved passageway of said carrier for limiting said carrier to rotate relative to said sliding member.

5. The machine tool as claimed in claim 1, wherein said sliding member includes an angular graduation for indicating an angular position of said carrier relative to said sliding member.

6. The machine tool as claimed in claim 1, wherein said follower includes a column extended upwardly therefrom, said sliding member is slidably attached onto said column of said follower, a threaded member is rotatably mounted on said column of said follower and disposed parallel to the Z-axis, and a motor is attached to said follower and coupled to said threaded member for rotating said threaded member relative to said column of said follower, said sliding member is slidably attached onto said column of said follower and engaged with said threaded member which actuates said sliding member to move along said threaded member and the Z-axis.

7. The machine tool as claimed in claim 1, wherein said follower includes a curved channel formed therein and disposed around said axle, and a fastener is secured to said carriage and slidably engaged with said curved channel of said follower for limiting said follower to rotate relative to said carriage.

8. The machine tool as claimed in claim 1, wherein said tool holder includes a bore formed therein, and a shaft rotatably received and engaged in said bore of said tool holder and rotatable and adjustable relative to said tool holder to selected angular positions for supporting said tool member.

9. The machine tool as claimed in claim 8, wherein said tool holder includes an angular graduation for indicating an angular position of said shaft relative to said tool holder.

10. The machine tool as claimed in claim 8, wherein said shaft includes a section extended out of said tool holder and secured to a hand grip.

11. The machine tool as claimed in claim 10, wherein said shaft includes a stop secured to said hand grip, and an anchor member attached onto said tool holder and engageable with said anchor member for limiting said shaft and said hand grip to rotate relative to said tool holder.

12. The machine tool as claimed in claim 11, wherein said tool holder includes a spring member engaged between said tool holder and said anchor member for resiliently anchoring and securing said anchor member to said tool holder.

13. The machine tool as claimed in claim 8, wherein said shaft includes a plurality of slots formed in an outer peripheral portion thereof and equally spaced from each other, and a latch is slidably engaged in said tool holder and includes an actuating member engageable into said slots of said shaft for anchoring and latching said shaft to said tool holder at the selected angular positions.

14. The machine tool as claimed in claim 13, wherein said tool holder includes a bar secured thereon and having an aperture formed therein for slidably receiving said latch.

15. The machine tool as claimed in claim 14, wherein said bar includes a deeper cavity and a shallower cavity formed therein, a knob is secured to said latch and includes a projection extended outwardly therefrom for engaging with either said deeper cavity or said shallower cavity of said bar and arranged for retaining said actuating member of said latch either in engagement with said slots of said shaft or in disengagement from said shaft.

16. The machine tool as claimed in claim 8, wherein said shaft includes an orifice formed therein, and a barrel slidably received in said orifice of said shaft and secured to said shaft with a fastener for supporting said tool member.

17. The machine tool as claimed in claim 16, wherein said barrel includes a noncircular chamber formed therein for engaging with a shank of said tool member.

18. The machine tool as claimed in claim 17, wherein said barrel includes a flat surface formed therein, and said tool member includes a flat surface for engaging with said flat surface of said barrel and for preventing said shank of said tool member from rotating relative to said barrel and said shaft.

19. The machine tool as claimed in claim 17, wherein said tool member includes an inclined ramp formed in said shank, and a fastener is engaged through said barrel and engaged into said noncircular chamber of said barrel and engageable with said ramp of said shank of said tool member for securing said shank of said tool member to said barrel and to said shaft.

* * * * *